United States Patent [19]

Chang

[11] Patent Number: 4,965,546
[45] Date of Patent: Oct. 23, 1990

[54] WARNING DEVICE TO ALERT PASSERS-BY BEFORE OPENING AN AUTOMOBILE DOOR

[76] Inventor: Jih-Cheng Chang, 3Fl., No. 4, Lane 244, Hsing Lung Road, Sec. 2, Chin Mei, Taipei, Taiwan

[21] Appl. No.: 401,110

[22] Filed: Aug. 31, 1989

[30] Foreign Application Priority Data

Jul. 12, 1988 [TW] Taiwan .............................. 77206568

[51] Int. Cl.$^5$ .............................................. B60Q 1/26
[52] U.S. Cl. .................................... 340/468; 340/463; 340/471; 307/10.1
[58] Field of Search .................... 340/468, 425.5, 463, 340/457.1, 471, 470; 307/9.1, 10.3, 10.1

[56] References Cited

U.S. PATENT DOCUMENTS

| | | | |
|---|---|---|---|
| 3,112,467 | 11/1963 | Benning | 340/457.1 |
| 3,504,336 | 3/1970 | Boblitz | 340/457.1 |
| 3,735,833 | 5/1973 | Sutkowski | 340/425.5 |
| 3,875,556 | 4/1975 | Beaird | 340/457.1 |
| 4,833,448 | 5/1989 | Chang | 340/425.5 |
| 4,849,733 | 7/1989 | Conigliaro et al. | 340/457.1 |

FOREIGN PATENT DOCUMENTS

2836767  9/1979  Fed. Rep. of Germany .
 221735 12/1983  Japan .

*Primary Examiner*—Donnie L. Crosland
*Attorney, Agent, or Firm*—Leonard Bloom

[57] ABSTRACT

A warning device to alert passers-by before opening an automobile door is proposed. The warning device has a seatbelt switch operable in association with a seatbelt fastener, a door switch operable in association with a door lock, warning lights visible to passers-by, and relays through which warning lights are turned on when the seatbelt fastener is disengaged or the door lock is unlocked.

3 Claims, 4 Drawing Sheets

WARNING DEVICE TO ALERT PASSERS-BY BEFORE OPENING AN AUTOMOBILE DOOR

BACKGROUND OF THE INVENTION

This invention relates to a warning device to alert passers-by before opening an automobile door, and more particularly to a warning device to be installed in an automobile to be operated in association with a seatbelt fastener of the automobile, to produce a visible warning signal to alert passers-by, particularly oncoming motorists, before an automobile door is opened.

Modern automobiles are equipped with several warning devices such as turn signals which warn passers-by of the intention to turn the automobile in a certain direction, and door warning lights which alert the driver when an automobile door has been improperly closed or unlocked. However, there has not been a proper means to warn passers-by or followers of an intention to open an automobile door before the driver or an occupant of the automobile gets out of the automobile. Thus it often happens that when someone, unaware of passers-by, wants to get out of an automobile and opens an automobile door, the open door obstructs passers-by and causes a collision. Such accidents can be prevented if a proper warning is given to the passers-by before the automobile door is opened.

BRIEF DESCRIPTION PRIOR ART

U.S. Pat. No. 3,735,833 discloses a theft prevention device which includes a switch controlled through a door lock to activate appropriate circuits to open the ignition circuit when the door is unlocked.

Japanese laid open patent No. 58-221735 discloses an unlocked warning unit which includes unlocked detecting switches which are turned on in an unlocked condition to light a warning lamp when the car's ignition switch is turned on.

Neither of the above-mentioned two patents suggests a warning device to alert passers-by before opening an automobile door.

U.S. Pat. No. 4,833,448, which has been granted to the inventor of the present application, proposes a warning device which includes a relay operable by a door look switch to turn on warning lights visible to passers-by. In this patent the warning lights are turned on when an automobile door is unlocked, and if the door is opened immediately after the door is unlocked, there might not be sufficient time for passers-by to be alerted to the intended opening of the automobile door.

Therefore it is primary object of this invention to offer a warning device which gives an early warning signal to alert passers-by before an automobile door is opened.

SUMMARY OF THE INVENTION

The warning device of this invention includes a left side unit and a right side unit. Each unit includes a seatbelt switch operable in association with a seatbelt fastener of a seatbelt of the automobile, a door lock switch operable in association with a door lock of the automobile, warning lights which include the automobile's turn signal lights and brake light, and relays through which the warning lights are turned on when the seatbelt fastener is disengaged and the seatbelt switch is activated while the door lock remains locked, so as to provide an early warning signal to passers-by.

The relays are so arranged that when the door lock is unlocked, the door lock switch is operated to turn on the warning lights regardless of whether or not the seatbelt fastener is engaged.

The relays are also so arranged that the warning lights are turned on by the seatbelt switch when the seatbelt fastener is disengaged only after the door lock has been previously locked and the seatbelt has been engaged.

A BRIEF DESCRIPTION OF THE DRAWINGS

DETAILED DESCRIPTION OF THE INVENTION

Figure 1:
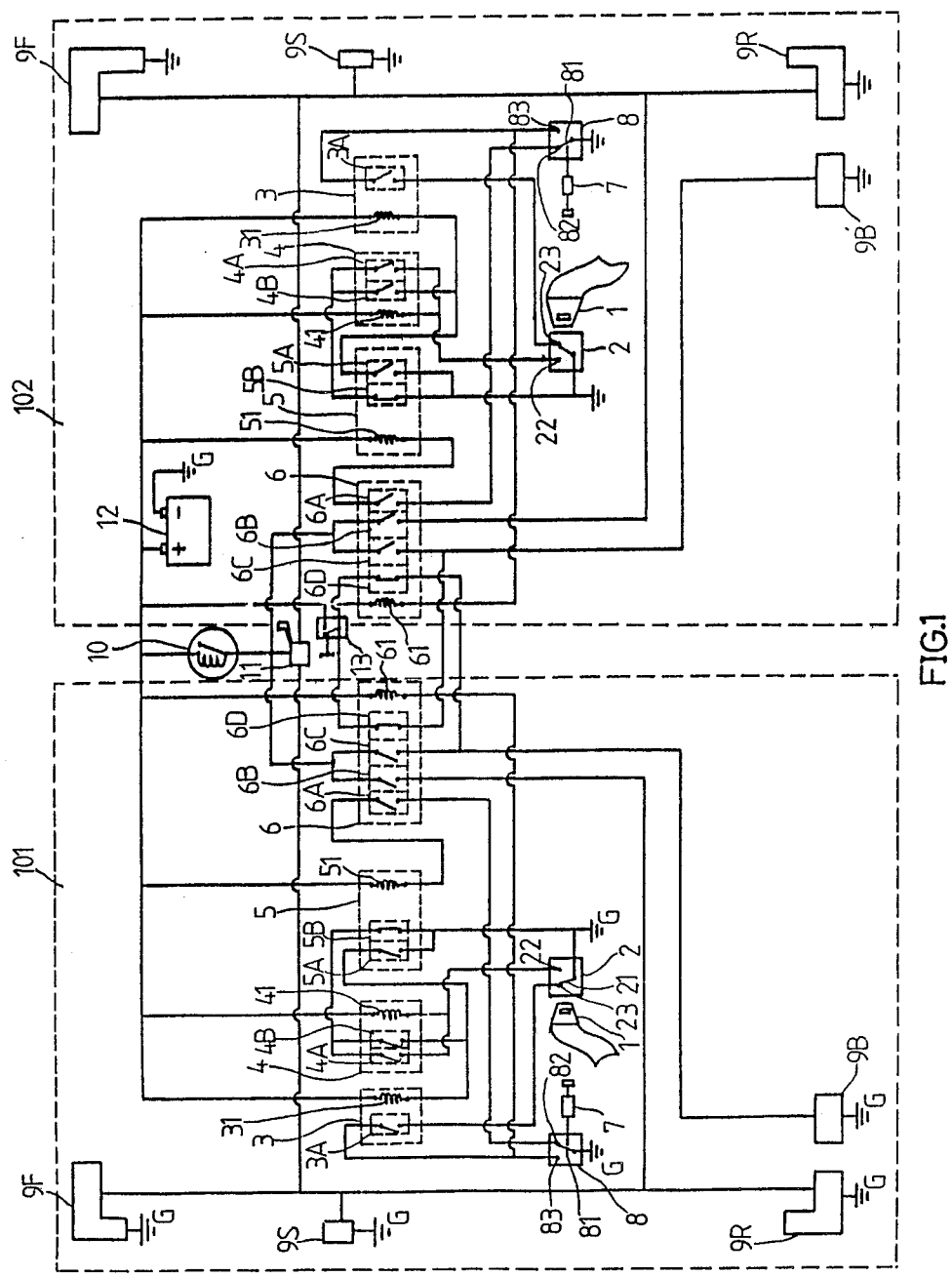
FIG. 1 is an electrical wiring diagram of an embodiment of the warning device of the present invention, showing the condition when the door lock has been locked and the seatbelt fastener has been disengaged.

FIG. 1 shows, in the form of a wiring diagram, a preferred embodiment of the warning device of this invention.

The warning device of this invention has a left side unit 101 and a right side unit 102 corresponding with left side unit 101.

Each one of left side unit 101 and right side unit 102 has a seatbelt switch 2 operable in association with a seat belt fastener 1, a door lock switch 8 operable in association with a door lock 7, a combination of relays including a first relay 3, a second relay 4, a third relay 5, and a fourth relay 6, a group of warning lights 9F, 9S, 9R and 9B (in which 9F represents a front turn signal light, 9S represents a side turn signal light, 9R represents a rear turn signal light, and 9B represents a brake light).

The warning device uses a blinker 10, a turn signal switch 11 and a brake light switch 13 in common for left side unit 101 and right side unit 102.

The arrangement of the warning device of this invention will be described with reference to left side unit 101; the description of right side unit 102 will be omitted to avoid redundancy.

Seatbelt switch 2 has a movable contact arm 21 connected to ground G, a first terminal 22, and a second terminal 23; movable contact arm 21 being movable in association with seatbelt fastener 1 such that when seatbelt fastener 1 is engaged, movable contact arm is caused to contact first terminal 22, and when seatbelt fastener 1 is disengaged, movable contact arm 21 is caused to contact second terminal 23.

Door lock switch 8 has a movable contact arm 81 connected to ground G, a first terminal 82 and a second terminal 83. Movable contact arm 81 is movable in association with door lock 7 such that when door lock 7 is locked, movable contact arm 81 is caused to contact first terminal 82, and when door lock 7 is unlocked, movable contact arm is caused to contact second terminal 83.

First relay 3 has a solenoid 31 and a switch 3A; when solenoid 31 is energized, switch 3A is caused to close, and when solenoid 31 is de-energized, switch 3A is caused to open.

Second relay 4 has a solenoid 41, a first switch 4A and a second switch 4B; when solenoid 41 is energized, first switch 4A and second switch 4B are caused to close, and when solenoid 41 is de-energized, first switch 4A and second switch 4B are caused to open.

Third relay 5 has a solenoid 51, first switch 5A and second switch 5B; when solenoid 51 is de-energized, first switch 5A is caused to open and second switch 5B is caused to close; when solenoid 51 is energized, first switch 5A is caused to close and second switch 5B is caused to open.

Fourth relay 6 has a solenoid 61, a first switch 6A, a second switch 6B, a third switch 6C, and a fourth switch 6D. When solenoid 61 is de-energized, first switch 6A, second switch 6B and third switch 6C are caused to open, and fourth switch 6D is caused to close; when solenoid 61 is energized, first switch 6A, second switch 6B, and third switch 6C are caused to close, and fourth switch 6D is caused to open.

As shown in FIG. 1, second terminal 83 of door lock switch 8 is connected to second terminal 23 of seatbelt switch 2 through switch 3A of first relay 3. Solenoid 31 has a first end connected to ground G through first switch 5A of third relay 5, and a second end connected to a positive terminal of battery 12 having a negative terminal connected to ground G. The first end of solenoid 31 is also connected to first terminal 22 of seatbelt switch 2 through a series connection of second switch 4B and first switch 4A of second relay 4; it is also connected to ground G through a series connection of second switch 4B of second relay 4 and second switch 5B of third relay 5.

Solenoid 41 of second relay 4 has a first end connected to ground G through a series connection of first switch 4A of second relay 4 and second switch 5B of third relay 5, and a second end connected to the positive terminal of battery 12; the first end of solenoid 41 is also connected to first terminal 22 of seatbelt switch 2.

Solenoid 51 of third relay 5 has a first end connected to first terminal 82 of door lock switch 8 through first switch 6A of fourth relay 6, and a second end connected to the positive terminal of battery 12.

Solenoid 61 of fourth relay 6 has a first end connected to second terminal 83 of door lock switch 8, and a second end connected to the positive terminal of battery 12. The first end of solenoid 61 is also connected to second terminal 23 of seatbelt switch 2 through switch 3A of first relay 3. Each one of front turn signal light 9F, side turn signal light 9S, and rear turn signal light 9R has a first end connected to the positive terminal of battery 12 through a series connection of second switch 6B of fourth relay 6 and a blinker 10, and a second terminal connected to ground G.

The first ends of front turn signal light 9F, side turn signal light 9S, and rear turn signal light 9R are also connected to a turn signal operating switch 11 as in a conventional automobile. Brake light 9B has a first end connected to positive terminal of battery 12 through a series connection of third switch 6C of fourth relay 6R, and a second end connected to ground G.

The first end of brake light 9B is also connected to a brake light switch 13 through fourth switch 6D of fourth relay 6 of the opposite, right side unit 102 of the warning device.

The operation of the warning device of this invention as described above will be described as follows, with reference to the left side unit 101.

Referring to FIG. 1, which shows the condition when door lock 7 is locked and seatbelt fastener 1 is disengaged, as when the automobile is left in a parking lot. Movable contact arm 81 of door lock switch 8 is in contact with first terminal 82 and movable contact arm 21 of seatbelt switch 2 is in contact with second terminal 23. In this condition solenoids 31, 41, 51, and 61 of first, second, third and fourth relays are de-energized. The right side unit 102 is in the same condition.

Figure 2:
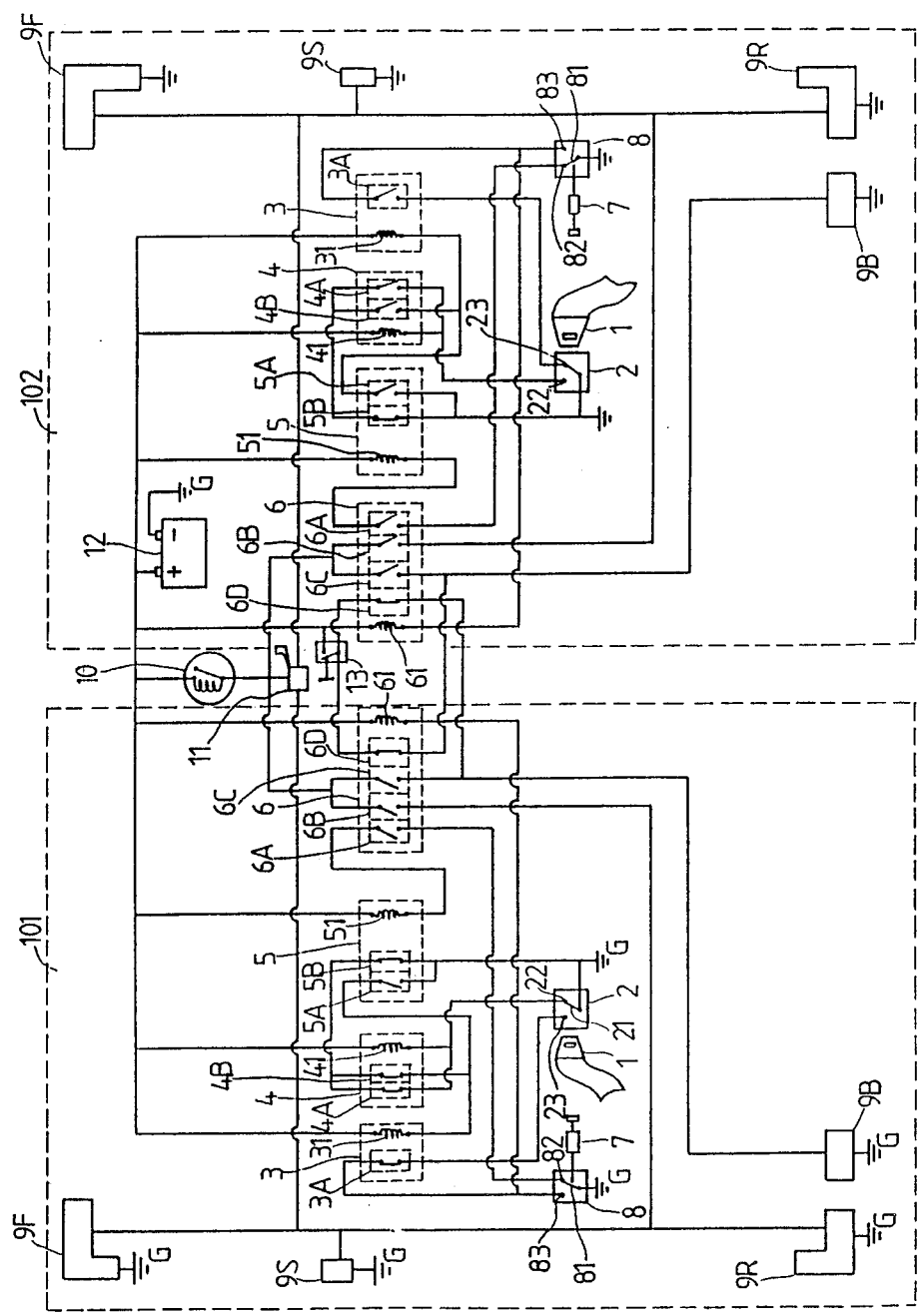
FIG. 2 is an electrical wiring diagram, showing the condition when the left side seat belt fastener has been engaged while the left side door lock remains locked.

When the driver gets into the automobile, sits on the left side seat of the automobile, locks the left side door lock 7 and fastens the seat belt, seatbelt fastener 1 is engaged and seat belt switch 2 is activated to cause movable contact arm 21 to come in contact with first terminal 22, as shown in FIG. 2. Electric current is then supplied to solenoid 41 through movable contact arm 21 and first terminal 22 of seatbelt switch 2, and solenoid 41 of second relay 4 is energized. As a result first switch 4A and second switch 4B of second relay 4 are closed and solenoid 31 of first relay 3 is energized to close switch 3A of first relay 3, as shown in FIG. 2. At this time electric current is also supplied to solenoid 41 through first switch 4A (which is now closed) of second relay 4 and second switch 5B (which remains closed) of third relay 5.

It should be noted that in this condition solenoid 31 of first relay 3 is energized by the power supplied from battery 12 through two routes: the first route consists of first terminal 22 of seatbelt switch 2, first switch 4A and second switch 4B of second relay 4, and the second route consists of second switch 5B of third relay 5 and second switch 4B of second relay 4, as shown in FIG. 2. The second route provides a holding circuit to maintain the power supply to solenoid 31 of first relay 3 when seatbelt fastener 1 is disengaged to cause movable contact arm 21 of seatbelt switch 2 to come in contact with second terminal 23.

Figure 3:
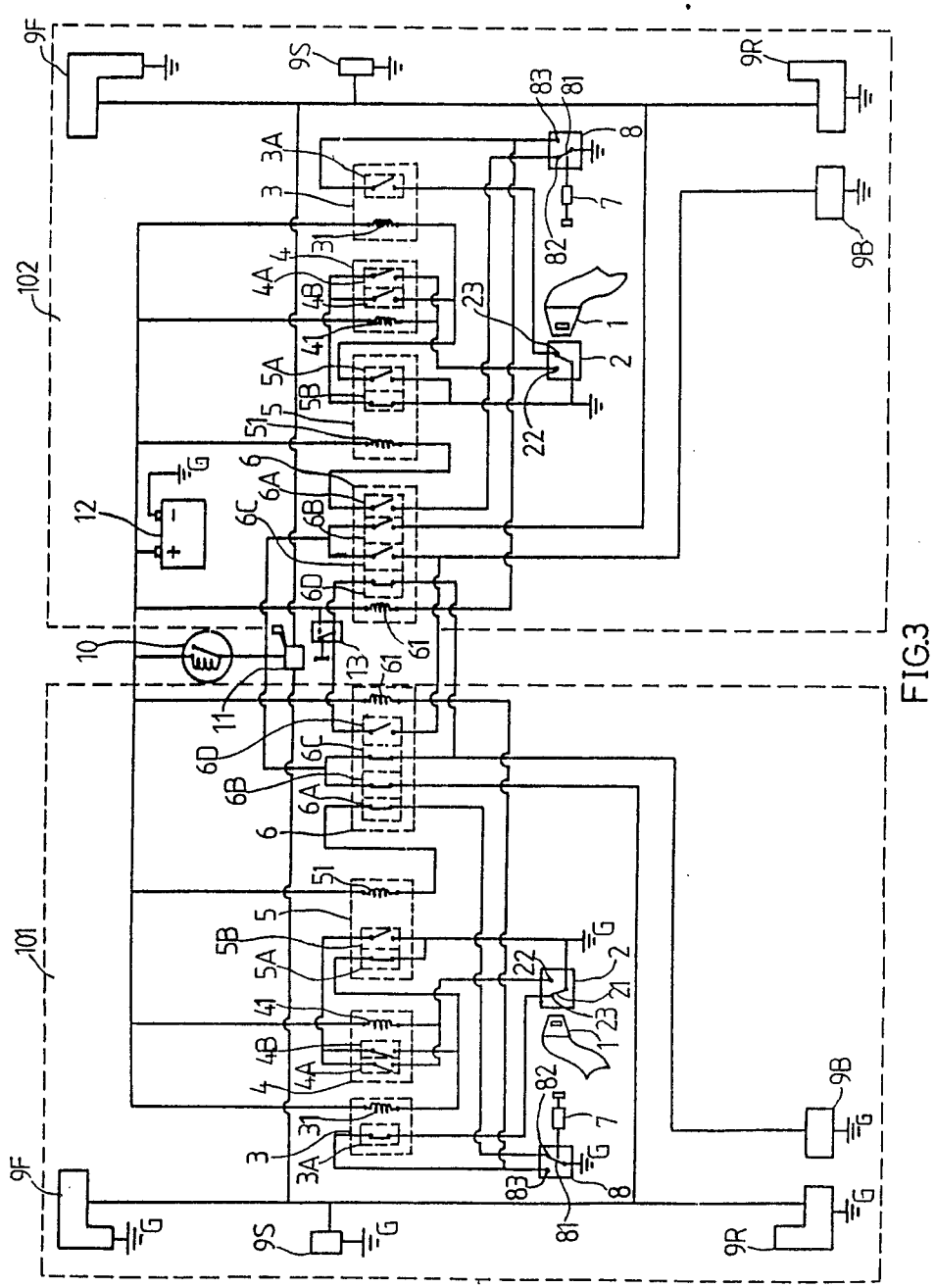
FIG. 3 is an electrical wiring diagram, showing the condition when the left side seat belt fastener has been disengaged after the left side seat belt had been previously engaged while the left side door lock remains locked.

When the driver wants to get out of the automobile and disconnects his seatbelt, seatbelt fastener 1 is disengaged and movable contact arm 21 of seatbelt switch 2 is caused to come in contact with second terminal 23. In this condition the power supply to solenoid 41 through first terminal 22 of seatbelt switch 2 is disconnected but the power supply to solenoid 41 through switch 4A and switch 5B is maintained, therefore solenoid 41 remains energized, and switches 4A and 4B remain closed. And, the above-mentioned first route of power supply to solenoid 31 is disconnected but the second route is maintained, therefore solenoid 31 remains energized and switch 3A of first relay 3 remains closed, as shown in FIG. 3. At this time the power is supplied through second terminal 23 of seatbelt switch 2 and switch 3A of first relay 3 to solenoid 61 of fourth relay 6 to energize solenoid 61. Then the following actions take place:

In fourth relay 6, fourth switch 6D is caused to open, and first, second, and third switches 6A, 6B, and 6C are caused to close.

Solenoid 51 of third relay 5 is energized, causing second switch 5B to open, and first switch 5A to close.

The power supply to solenoid 41 of second relay 4 is disconnected and solenoid 41 is de-energized to cause switch 4A and 4B to open.

First switch 5A of third relay 5 becomes another holding circuit for keeping solenoid 31 of first relay 3 energized; thus switch 3A remains closed, and solenoid 61 remains energized.

The power is supplied through second switch 6B and blinker 10 to front turn signal light 9F, side turn signal light 9S, and rear turn signal light 9R, and through third switch 6C and blinker 10 to brake light 9B, and these lights are turned on, and caused to blink.

The brake light 9B on the right side unit 102 becomes temporarily inoperative, until the seatbelt fastener is engaged again.

Figure 4:
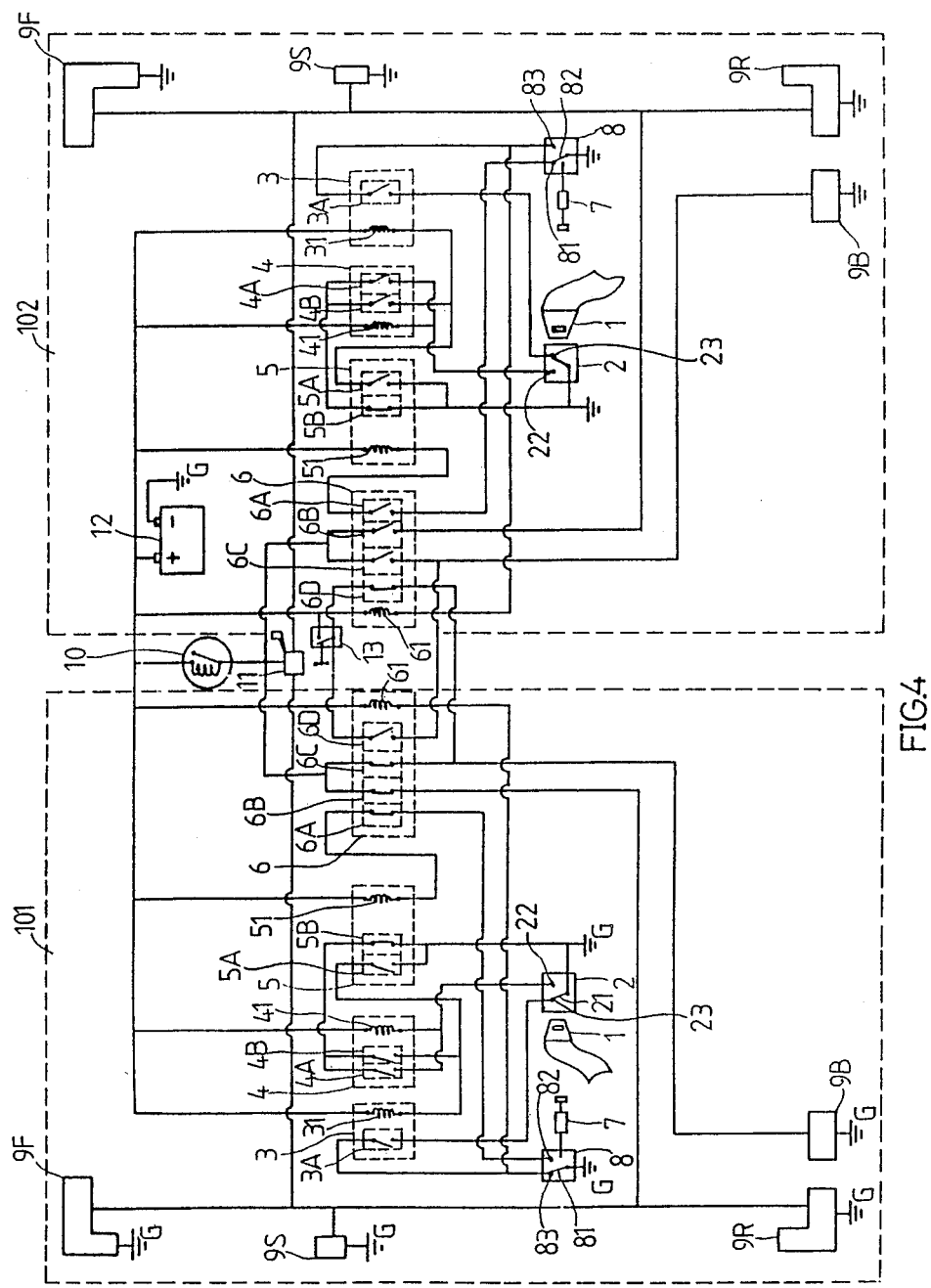
FIG. 4 is an electrical wiring diagram, showing the condition when the left side door lock has been unlocked while the left side seatbelt fastener remains disengaged.

When the driver is ready to get out of the automobile and unlocks door lock 7, movable contact arm 81 of door lock switch 8 is caused to switch to come in contact with second terminal 83, as shown in FIG. 4. In this condition, solenoid 51 of third relay is de-energized and consequently solenoid 31 of first relay 3 and solenoid 41 of second relay are deenergized. Solenoid 61 of relay 6 remains energized as the power to solenoid 61, which was supplied from second terminal 23 of seatbelt switch 2 through switch 3A, is now supplied from second terminal 83 of door lock switch 8, and front turn signal light 9F side turn signal light 9S, rear turn signal light 9R, and brake light 9B remain turned on blinking, until the door lock is locked again.

As soon as the driver gets out of the automobile, closes the door, and locks the door lock 7, door lock switch 8 is caused to switch its movable contact arm 81 to come in contact with first terminal 82, as shown in FIG. 1; in this condition the solenoids of all relays are de-energized, and the warning lights are turned off.

It should be noted that when the driver unlocks door lock 7 with the seatbelt fastener 1 engaged or disengaged, door lock switch 8 will be activated to cause movable contact arm 81 to come in contact with first terminal 82, so as to energize solenoid 61 of fourth relay 6, and front turn signal light 9F, side turn signal light 9S, rear turn signal light 9R, as well as brake light 9B will be turned on blinking, until door lock 7 is locked.

As described above, the warning device of this invention produces warning signals as soon as the driver or occupant of the automobile disconnects the seatbelt; passers-by are warned even before the driver or the occupant unlocks the door lock. According to an observation of the inventor, the process of disconnecting the seatbelt, unlocking the door lock, and opening the car door normally requires a minimum of five seconds. Such a time lag will enable passers-by to take precautions before the door is swung open.

It is to be understood that relays 3, 4, 5 and 6 can be replaced by IC devices or inverters to perform the same functions as described. Other modifications are possible by persons skilled in the art without departing from the spirit of the appended claims.

What is claimed is:

1. A warning device to alert passers-by before opening an automobile door, comprising:
   a left side unit;
   a right side unit corresponding to said left side unit;
   each one of said left side unit and said right side unit comprising:
   a seat belt switch operable in association with a fastener for the seat belt on the side of the automobile corresponding to the side of said unit;
   a door lock switch operable in association with a door lock for a door of the automobile on the side thereof corresponding to the side of said unit;
   warning lights including at least one turn signal light for the side of the automobile corresponding to the side of said unit and a brake light mounted on the outside of the automobile to be visible to passers-by; and
   relay means controlled by said door lock switch and said seat belt switch for turning on said turn signal light for the side corresponding to the side of said unit when said seat belt fastener is disengaged after said seat belt has been engaged and said door lock has been locked and thereafter turning off said turn signal light when said door lock is again locked.

2. A warning device as claimed in claim 1, wherein said relay means further includes:
   a relay for disabling said brake light on the side of the automobile opposite the side of the automobile corresponding to the side of said unit when said turn signal light is turned on by said unit.

3. A warning device for an automobile to alert passers-by before opening a door of the automobile, comprising:
   a battery;
   a plurality of warning lights visible from the exterior of the automobile;
   said warning lights including at least one right turn signal light, at least one left turn signal light and at least one brake light;
   a blinker for causing said warning lights to flash;
   a brake light switch;
   a left side unit;
   a right side unit corresponding to said left side unit,
   each one of said left side unit and said right side unit including:
   a seat belt having a fastener operable by an occupant of the automobile;
   a seat belt switch operable in association with said seat belt fastener;
   a door lock switch operable in association with a door lock of the automobile; and
   relay means controlled by said left and right side units for selectively energizing particular ones of said warning lights;
   said seat belt switch including:
   a moveable contact arm, a first terminal, and a second terminal, said moveable contact arm being caused to contact said first terminal when said seat belt fastener is engaged and being caused to contact said second terminal when said seat belt fastener is disengaged;
   said door lock switch including:
   a moveable contact member, a first contact point and a second contact point, said moveable contact member being caused to contact said first contact point when said door lock is locked and being caused to contact said second contact point when said door lock is unlocked;
   said relay means including:
   a first relay having a first solenoid and a first switch which is caused to close when said first solenoid is energized, and which is caused to open when said first solenoid is de-energized;
   a second relay having a second solenoid, a second switch and a third switch, said second switch and said third switch being caused to close when said second solenoid is energized, and being caused to open when said second solenoid is de-energized;

a third relay having a third solenoid, a fourth switch and a fifth switch, said fourth switch being caused to close and said fifth switch being caused to open when said third solenoid is energized, said fourth switch being caused to open and said fifth switch being caused to close when said third solenoid is de-energized;

a fourth relay having a fourth solenoid, a sixth switch, a seventh switch, an eighth switch and a ninth switch, said sixth, seventh and eighth switches being caused to close and said ninth switch being caused to open when said fourth solenoid is energized, and said sixth, seventh and eighth switches being caused to open and said ninth switch being caused to close when said fourth solenoid is de-energized.

said first contact point of said door lock switch being connected to said second terminal of said seat belt switch through said first switch of said first relay, and also being connected to said battery through said fourth solenoid;

said first solenoid having one end which is:

connected to ground through said fourth switch of said third relay, and also connected to said first terminal of said seat belt switch through a series connection of said second switch and third switch of said second relay, and also connected to ground through a series connection of said third switch of said second relay and said fifth switch of said third relay, said first solenoid having another end connected to said battery, said second solenoid having one end connected to ground through a series connection of said second switch of said second relay and said fifth switch of said third relay, and also connected to said first terminal of said seat belt switch, said second solenoid having another end connected to said battery, said third solenoid having one end connected to said second contact point of said door lock switch through said sixth switch of said fourth relay and another end connected to said battery, said left turn signal and right turn signal warning lights each having one end connected to said battery through a series connection of said seventh switch of said fourth relay and said blinker, said brake light having one end connected to said battery through a series connection of said eighth switch of said fourth relay and said blinker, said one end of said brake light being also connected to said battery through a series connection of the ninth switch of the opposite one of said left and right side units and said brake switch;

whereby said turn signal light for the side of the automobile corresponding to the side of said unit is turned on when said seat belt fastener is disengaged after said seat belt has been engaged and said door lock has been locked and is thereafter turned off when said door lock is again locked.

* * * * *